United States Patent [19]
Flückiger

[11] Patent Number: 5,639,289
[45] Date of Patent: Jun. 17, 1997

[54] INSTALLATION FOR THE TREATMENT OF PLATES

[75] Inventor: Willy Flückiger, Aarwangen BE, Switzerland

[73] Assignee: Bystronic Maschinen AG, Bützberg, Switzerland

[21] Appl. No.: 549,233

[22] Filed: Oct. 27, 1995

[30] Foreign Application Priority Data

Oct. 28, 1994 [CH] Switzerland ............ 03231/94

[51] Int. Cl.⁶ .................. C03B 21/04; C03B 23/26; C03B 33/10
[52] U.S. Cl. .................. 65/166; 65/112; 65/174
[58] Field of Search .................. 65/166, 105, 112, 65/174

[56] References Cited

U.S. PATENT DOCUMENTS

| | | | |
|---|---|---|---|
| 4,579,483 | 4/1986 | Padovani | 408/39 |
| 4,698,088 | 10/1987 | Bando | 65/174 |
| 5,116,169 | 5/1992 | Loy | 408/39 |

FOREIGN PATENT DOCUMENTS 0135849   4/1985   European Pat. Off. .

OTHER PUBLICATIONS

Patent Abstracts of Japan, vol. 10 No. 21 (M-449) [2078] Jan. 28, 1986 & JP,A,60 180734 (Nissan) Sep. 14, 1985.

*Primary Examiner*—Donald E. Czaja
*Assistant Examiner*—Jacqueline A. Ruller
*Attorney, Agent, or Firm*—Richard Linn

[57] ABSTRACT

Unworked glass panes (9) are definitively positioned in a positioning station (15) by means of positioning stops (18) and transferred in a fixed position first to a grinding station (12) and then to a transfer station (7) by a translating device (20, 21, 22, 23). From the transfer station (7), the ground panes are transferred by means of a feeding device (6) to a drilling station (1) where holes are drilled into the panes. The finished panes are then returned to the transfer station (7) and are removed therefrom. A complete treatment is thus effected in a once determined position without any subsequent positioning. The drilling station is therefore free from any positioning means.

20 Claims, 2 Drawing Sheets

INSTALLATION FOR THE TREATMENT OF PLATES

BACKGROUND OF THE INVENTION

The present invention refers to an installation for the treatment of plates, more particularly of glass panes, comprising at least a drilling station for the purpose of drilling holes into the plates. In known installations of this kind, the plates are delivered to a drilling station, where they are first positioned and subsequently drilled. A substantial inconvenience is the fact that the positioning means, e.g. positioning stops are exposed to the direct influence of the cooling liquid and of the eroded material from drilling. Resetting the installation for different plates is complicated.

SUMMARY OF THE INVENTION

It is an object of the present invention to avoid the mentioned drawbacks and to provide optimal conditions for the integration of the drilling station in an integrated treating installation comprising a grinding station. This object is attained in an installation for the treatment of plates wherein the drilling station is provided with a feeding device allowing delivery of previously positioned plates to a drilling position, since the plates, more particularly the glass panes, are delivered in a pre-positioned condition, positioning means such as positioning stops are no longer needed in the immediate vicinity of the drilling tools. The supply device is preferably provided with a rotatable support such as a vacuum disk for the plates, so that the possibilities for the mutual orientation of the plate to be drilled and of the drilling tools are substantially unlimited. Since the plates are positioned by abutment to stops only once and subsequently manipulated only by controlled transfers to the new treatment positions, the risk of scratching the plates is smaller, and the adaptation of the installation to plates of different kinds can be largely preprogrammed and quickly executed.

BRIEF DESCRIPTION OF THE DRAWINGS

The invention is explained in more detail hereinafter with reference to an embodiment of an installation for the treatment of glass panes e.g. for the automobile industry.

DETAILED DESCRIPTION OF THE INVENTION

Figure 1:
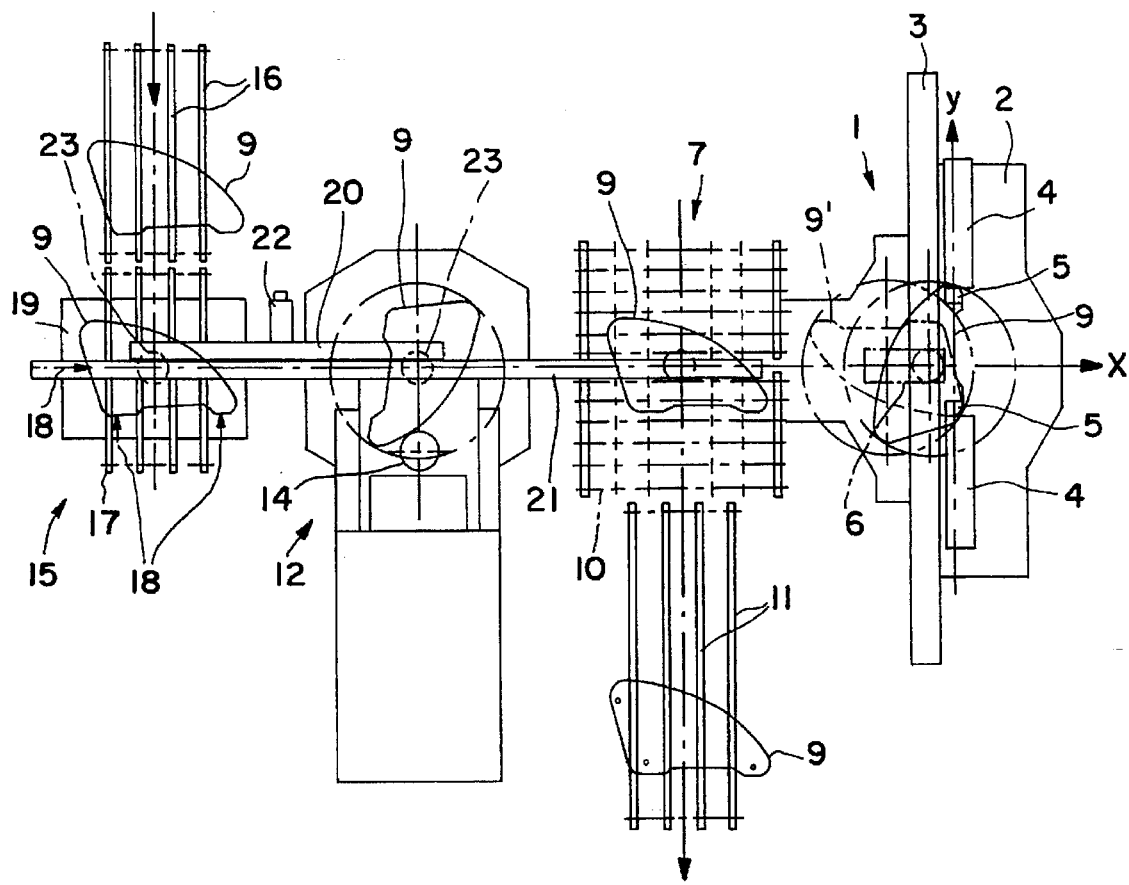
FIG. 1 shows a plan view of the installation.

The installation shown in FIG. 1 comprises a drilling station 1 including the proper drilling machine 2. Two slides 4 are displaceable in the y direction along a guide 3 of the drilling machine. Each slide 4 carries a drilling head 5 having a schematically indicated but not specially designated drilling tool. In a basically usual manner, the two respective drilling heads 5 are disposed one above another in order to drill a supplied glass pane to a certain depth from below and from above, so that the pane is drilled through without the risk of splintering the edges of the hole.

Figure 2:
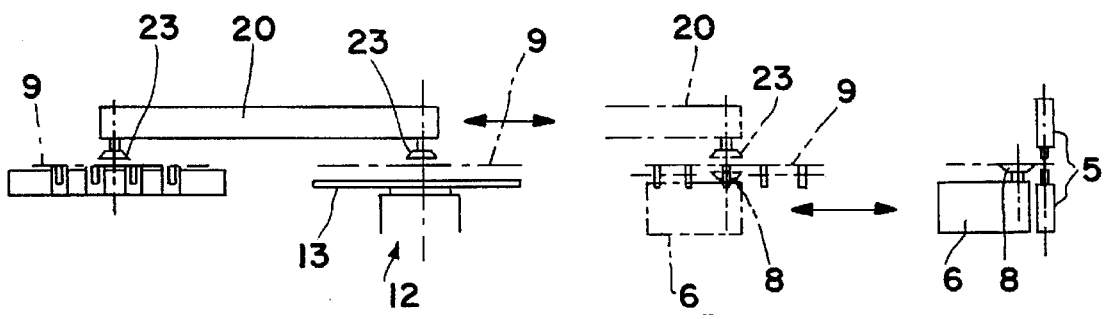
FIG. 2 shows a lateral view of the essential elements of the installation.

The drilling station is provided with a feeding device 6 in the form of a carriage which is displaceable along a non-represented guide in the x direction between the proper drilling machine 2 and a transfer station 7. As shown in FIG. 2, on the upper side of the feeding device 6, a vacuum disk 8 is provided which serves the purpose of aspirating and holding a glass pane 9. In FIG. 1, glass pane 9 is represented in the drilling machine in two positions 9 resp. 9'. This means that vacuum disk 8 with an aspirated pane 9 can be rotated to the desired position. This rotative adjustment, along with the adjustment of the feeding device in the x direction and the adjustment of drilling heads 5 in the y direction, allows the drilling station to drill holes at any location of pane 9. Pane 9 is additionally clamped for the drilling procedure.

In FIG. 1, parts of a roller transport 10 are disposed in transfer station 7 on the side of a central passage for the feeding device, e.g. the vacuum disk 8, said transport being capable of transferring glass panes 9 from the transfer station to conveyor belts 11 in order to remove finished panes in the direction of the arrow, i.e. transversally to the direction of movement of feeding device 6.

As shown in FIGS. 1 and 2, the installation further comprises a grinding station 12 of a basically traditional construction. Previously postitioned panes 9 are placed on a vacuum support 13 which is rotatable around a vertical axis in order to grind the edges of pane 9 by means of a grinding wheel 14.

Furthermore, the installation is provided with a positioning station 15. As shown in FIG. 1, panes 9 are supplied to the positioning station by means of conveyor belts 16 and 17, where schematically indicated stops 18 are provided in an adjustable manner. Conveyor belts 17 can be lowered, so that a respective pane 9 is laid down on table 19. The table top is perforated, and compressed air can be supplied on which pane 9 is floating and easily displaceable. In a central opening of table 19, a non-represented, laterally displaceable vacuum disk is disposed by means of which pane 9 can be seized and displaced towards stops 18. A precise pre-positioning is thus effected which, however, serves as a definitive positioning for the entire treatment, as the pane is subsequently transferred to the grinding station and finally to the drilling station exclusively in its defined position according to the pre-positioning.

For this purpose, a translating device is provided. It comprises a slide 20 which is displaceable along a guide 21 by means of a driving motor 22. Slide 20 is provided with two vacuum disks which are capable of being lowered in order to precisely seize a pane. The two vacuum disks 23 serve to simultaneously transfer a positioned pane 9 from the positioning station to the grinding station and a ground pane from the grinding station to transfer station 7. In the transfer station, as described, pane 9 is then taken over and transferred to the drilling station by feeding device 6.

Figure 3:
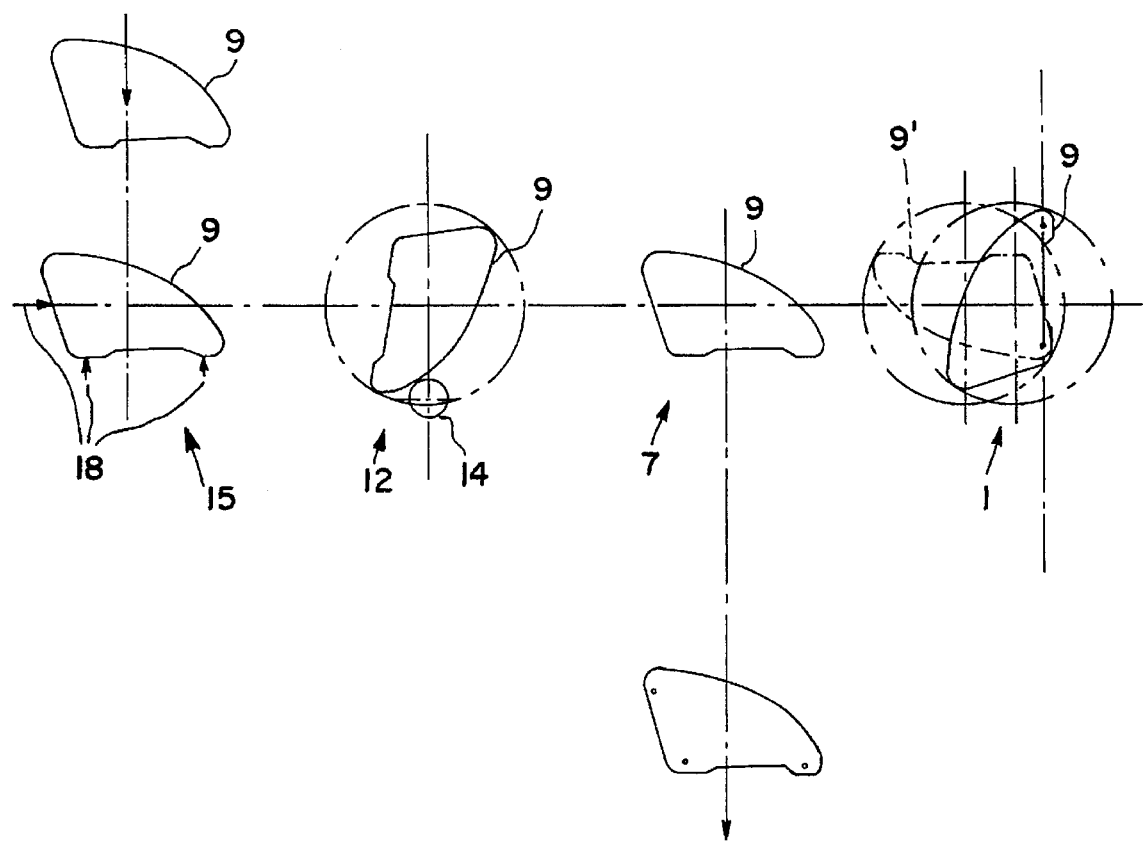
FIG. 3 schematically shows the sequence of operations in the installation.

This sequence of operations is schematically represented in FIG. 3. An unworked, cut pane 9 arrives in the positioning station, where it is guided against stops 18 and positioned in the described manner. It is then transferred to grinding station 12, where its edges are ground. Pane 9 is then transferred to transfer station 7, where it is seized by feeding device 6 and brought into the drilling position. FIG. 3 indicates that two holes are drilled in the first position 9, while another hole is drilled in a second position of the pane. The pane is then returned from the grinding position to transfer station 7, where it is seized by roller transport 10, transferred to conveyor belts 11 and removed.

All movements are centrally controlled by a determined program.

Some alternative embodiments are possible. For example, grinding station 12 might be omitted. However, an essential advantage of the illustrated installation is the very fact that the entire finishing treatment including the grinding and drilling procedures can be effected with a single positioning of the unworked panes. On the other hand, the installation might also be enlarged or extended by the addition of further identical processing lines in parallel to that of FIG. 1, wherein unworked panes 9 are transported by means of conveyor belts 17 through former positioning stations whose positioning stops 18 are ineffective, to the next one or the next but one and laid down on table 19 of the positioning station in which the pane is intended to be positioned and subsequently treated. Likewise, transfer stations 17 may be connected in series, so to speak, in which case finished panes are alternatingly transferred through transfer stations until they arrive on conveyor belts 11 and are finally removed or, alternatively, the panes may be seized by feeding device 6 after a preliminary treatment in the grinding station and transferred to the drilling station. In this case, additional conveyor belts for finished panes may be provided between the represented roller transports 7 of the transfer stations. Here also, all movements are coordinated by a central control.

I claim:

1. An installation for processing plates comprising:

a drilling station for drilling at least one hole in a plate;

hold means for holding and supporting said plate;

positioning means separate from said drilling station for positioning a plate relative to said hold means, where said hold means holds said plate after said positioning;

feeding means for transporting said hold means and said plate being held by said hold means from said positioning means into said drilling station, wherein the positioning of said plate relative to said hold means is maintained during transport; and rotation means for rotating said hold means and said plate held by said hold means while in said drilling station.

2. The installation of claim 1, wherein said hold means comprises at least one vacuum disk.

3. The installation of claim 1, wherein said feeding means are displaceable along an axis for the purpose of delivering plates to said drilling station, and wherein said drilling station comprises at least one drilling head displaceable along an axis which is transverse to the axis along which said feeding means are displaced.

4. The installation of claim 1, wherein said positioning means comprise:

a table having a cushion of air thereon for supporting said plate; and a plurality of stops against which said plate abuts when properly positioned relative to said hold means.

5. The installation of claim 4, wherein said positioning means further comprise means for urging a plate placed thereon against said stops.

6. The installation of claim 1, further comprising a grinding station wherein said feeding means transport said hold means and said plate between said positioning means and said grinding station, and between said grinding station and said drilling station.

7. The installation of claim 6, wherein said feeding means comprise means for simultaneously transporting a first plate between said positioning means and said grinding station, and a second plate between said grinding station and a transfer station.

8. The installation of claim 1, wherein said hold means comprise first hold means for holding said positioned plate when said plate is removed from said positioning means and second hold means for holding said positioned plate when said plate is moved into said drilling station;

wherein said plate is transferred from said first hold means to said second hold means at a transfer station while said positioning of said plate relative to said hold means is maintained following said transfer.

9. The installation of claim 8, wherein said first hold means holds said plate from above said plate and said second hold means holds said plate from below said plate.

10. The installation of claim 1, wherein a plurality of drilling stations each associated with a feeding means are disposed in parallel to each other, and said installation further comprises transport means for the removal of finished plates.

11. The installation of claim 10, wherein each drilling station also has an associated positioning station.

12. The installation of claim 1, wherein said plate is a pane of glass.

13. An installation for the processing of plates comprising:

a drilling station for drilling at least one hole in a plate;

hold means for holding and supporting said plate;

positioning means separate from said drilling station for positioning a plate relative to said hold means, where said hold means hold said plate after said positioning;

feeding means for transporting said hold means holding said plate into said drilling station, wherein said positioning of said plate relative to said hold means is maintained during transport; and wherein said hold means are the sole means of supporting and positioning said plate while in said drilling station.

14. The installation of claim 13, wherein said hold means comprise at least one vacuum disk.

15. The installation of claim 13, further comprising a grinding station wherein said feeding means transport said hold means and said plate between said positioning means and said grinding station, and between said grinding station and said drilling station.

16. The installation of claim 15, wherein said feeding means comprise means for simultaneously transporting a first plate between said positioning means and said grinding station, and a second plate between said grinding station and a transfer station.

17. The installation of claim 13, wherein said hold means comprise first hold means for holding said positioned plate when said plate is removed from said positioning means and second hold means for holding said positioned plate when said plate is moved into said drilling station;

wherein said plate is transferred from said first hold means to said second hold means at a transfer station while said positioning of said plate relative to said hold means is maintained following said transfer.

18. The installation of claim 17, wherein said first hold means holds said plate from above said plate and said second hold means holds said plate from below said plate.

19. The installation of claim 13, wherein said plate is a pane of glass.

20. A method for processing plates comprising the steps of:

supporting a plate;

positioning said plate relative to a hold means;

transporting said plate while maintaining said positioning of said plate from a place of positioning to a drilling station;

drilling at least one hole is said plate with said drilling station;

rotating said plate and said hold means within said drilling station to allow a plurality of holes to be drilled in different places in said plate.

* * * * *